United States Patent
Villier

(10) Patent No.: US 8,200,235 B2
(45) Date of Patent: Jun. 12, 2012

(54) RESOURCE PARTITIONING IN A CELLULAR COMMUNICATION SYSTEM

(75) Inventor: Eric Villier, Swindon (GB)

(73) Assignee: Motorola Mobility, Inc., Libertville, IL (US)

( * ) Notice: Subject to any disclaimer, the term of this patent is extended or adjusted under 35 U.S.C. 154(b) by 1049 days.

(21) Appl. No.: 12/088,005

(22) PCT Filed: Nov. 28, 2006

(86) PCT No.: PCT/US2006/045475
§ 371 (c)(1),
(2), (4) Date: Mar. 25, 2008

(87) PCT Pub. No.: WO2007/064612
PCT Pub. Date: Jun. 7, 2007

(65) Prior Publication Data
US 2008/0261610 A1  Oct. 23, 2008

(30) Foreign Application Priority Data
Nov. 29, 2005  (GB) .................................. 0524388.6

(51) Int. Cl.
*H04B 7/212* (2006.01)
*H04B 7/26* (2006.01)

(52) U.S. Cl. ......................................... 455/450; 370/329

(58) Field of Classification Search .................. None
See application file for complete search history.

(56) References Cited

U.S. PATENT DOCUMENTS

| | | | |
|---|---|---|---|
| 5,844,894 A * | 12/1998 | Dent | 370/330 |
| 6,330,429 B1 * | 12/2001 | He | 455/67.11 |
| 6,405,046 B1 * | 6/2002 | Kumaran et al. | 455/453 |
| 2002/0058516 A1 * | 5/2002 | Amin | 455/455 |
| 2002/0147611 A1 | 10/2002 | Greene et al. | |
| 2003/0112762 A1 | 6/2003 | Hasan Mahmoud et al. | |
| 2003/0148768 A1 * | 8/2003 | Kakani et al. | 455/452 |
| 2003/0200439 A1 | 10/2003 | Moskowitz | |
| 2004/0029591 A1 | 2/2004 | Chapman et al. | |
| 2004/0192290 A1 * | 9/2004 | Muthuswamy et al. | 455/425 |
| 2004/0203938 A1 * | 10/2004 | Kulkarni | 455/464 |
| 2004/0252697 A1 * | 12/2004 | Wille et al. | 370/395.21 |
| 2005/0014496 A1 * | 1/2005 | Han et al. | 455/423 |
| 2005/0260997 A1 * | 11/2005 | Korale et al. | 455/452.2 |
| 2008/0311924 A1 * | 12/2008 | Lucidarme | 455/452.1 |

FOREIGN PATENT DOCUMENTS

WO   03024133 A1   3/2003
WO   WO 2005/076652 A1 *   8/2005

* cited by examiner

*Primary Examiner* — Rafael Pérez-Gutiérrez
*Assistant Examiner* — Frank Donado

(57) ABSTRACT

A cellular communication system (100) a first Radio Network Controller (107) supporting different communication service types. A first resource controller (203) controls resource allocation for a first communication service type from a first resource partition and a second resource controller (205) controls resource allocation for a second communication service type from a second resource partition. A partition processor (207) partitions a shared resource into at least the first and second resource partition in response to a first admission failure measure for the first communication service type. Optionally, the partition processor (207) may partition the shared resource into at least the first and second resource partition in response to a second admission failure measure for the first communication service type.

9 Claims, 2 Drawing Sheets

RESOURCE PARTITIONING IN A CELLULAR COMMUNICATION SYSTEM

FIELD OF THE INVENTION

The invention relates to resource partitioning in a cellular communication system and in particular, but not exclusively, to resource partitioning of a shared resource in a $3^{rd}$ Generation cellular communication system.

BACKGROUND OF THE INVENTION

Currently, the most ubiquitous cellular communication system is the 2nd generation communication system known as the Global System for Mobile communication (GSM). Further description of the GSM TDMA communication system can be found in 'The GSM System for Mobile Communications' by Michel Mouly and Marie Bernadette Pautet, Bay Foreign Language Books, 1992, ISBN 2950719007.

To further enhance the services and performance of the GSM communication system, a number of enhancements and additions have been introduced to the GSM communication system over the years.

One such enhancement is the General Packet Radio System (GPRS), which is a system developed for enabling packet data based communication in a GSM communication system. Thus, the GPRS system is compatible with the GSM (voice) system and provides a number of additional services including provision of packet data communication, which augments and complements the circuit switched communication of a traditional communication system. Furthermore, the packet based data communication may also support packet based speech services. The GPRS system has been standardised as an add-on to an existing GSM communication system, and can be introduced to an existing GSM communication system by introducing new network elements. Specifically, a number of Serving GPRS Support Nodes (SGSN) and Gateway GPRS Support Nodes (GGSN) may be introduced to provide a packet based fixed network communication.

3rd generation systems are currently being rolled out to further enhance the communication services provided to mobile users. One such system is the Universal Mobile Telecommunication System (UMTS), which is currently being deployed. Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876. The core network of UMTS is built on the use of SGSNs and GGSNs thereby providing commonality with GPRS.

$3^{rd}$ Generation cellular communication systems have been specified to provide a large number of different services including efficient packet data services. For example, downlink packet data services are supported within the $3^{rd}$ Generation Partnership Project (3GPP) release 5 Technical Specifications in the form of the High Speed Downlink Packet Access (HSDPA) service.

In accordance with the 3GPP specifications, the HSDPA service may be used in both Frequency Division Duplex (FDD) mode and Time Division Duplex (TDD) mode.

In HSDPA, transmission code resources are shared amongst users according to their traffic needs. The base station (also known as the Node-B for UMTS) is responsible for allocating and distributing the HSDPA resources amongst the individual calls. In a UMTS system that supports HSDPA, some of the code allocation is performed by the RNC whereas other code allocation, or more specifically, scheduling is performed by the base station. Specifically, the RNC allocates a set of resources to each base station, which the base station can use exclusively for high speed packet services. The RNC furthermore controls the flow of data to and from the base stations. However, the base station is responsible for scheduling HS-DSCH transmissions to the mobile stations that are attached to it, for operating a retransmission scheme on the HS-DSCH channels, for controlling the coding and modulation for HS-DSCH transmissions to the mobile stations and for transmitting data packets to the mobile stations.

HSDPA seeks to provide packet access techniques with a relatively low resource usage and with low latency.

Specifically, HSDPA uses a number of techniques in order to reduce the resource required to communicate data and to increase the capacity of the communication system. These techniques include Adaptive Coding and Modulation (ACM), retransmission with soft combining and fast scheduling performed at the base station.

However, in communication systems which support a number of different services, it is critical that the system can be flexibly optimised for different scenarios. For example, as the different service types all make use of the limited air interface resource, it is important that the available resource is effectively shared by the different types of communication services.

Specifically, in UMTS communication systems HSDPA services and conventional UMTS services as defined in Release 99 (R99) of the UMTS technical specifications typically share the same interference or power resource. In addition, the spreading of signals is based on spreading codes which are selected to achieve orthogonality in the downlink direction. In order to ensure that this orthogonality is maintained between different service types, the R99 and HSDPA services share the same code tree of orthogonal spreading codes (known as Orthogonal Variable Spreading Factor—OVSF codes).

The allocation of resource to a specific service type can impact the Quality of Service offered by that service and/or the capacity of that service. For example, if all the available resource for a communication service type is fully exploited, some communications may be dropped and/or new communications are prevented from being initiated.

A solution that is typically used to solve this problem is to allocate a fixed proportion of the resource to each service, i.e. the resource is not dynamically shared but is dedicated to one specific service in accordance with a resource partitioning. However, this tends to result in inefficient resource usage and reduced performance and capacity as the resource allocation tends not to reflect the varying conditions or requirements. For example, it can frequently occur that e.g. R99 services require more than the allocated resource allocation whereas the HSDPA services do not use the resource available to them.

Hence, an improved system resource allocation in a cellular communication system would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a cellular communication system comprising: a first resource controller for controlling resource allocation for a first communication service type from a first resource partition; a second resource controller for controlling resource allocation for a second communication service type from a second resource partition; a resource partitioner for partitioning a shared resource into at least the first and second resource partition in response to a first admission failure measure for the first communication service type.

The invention may allow improved resource usage. An improved quality of service may be provided for services of the first and/or second communication type. In particular, an improved allocation of a shared resource which reflects the dynamic changes and requirements of different communication service types can be achieved. An improved interoperability and/or compatibility between different communication service types may be achieved. An improved integration of new communication service types and existing communication service types can be achieved thereby facilitating enhancement of a cellular communication system.

By using a measure of the admission failure, the resource partitioning may effectively reflect the service requirements of the different communication service types rather than merely the current communication resource usage.

The first and second resource controllers may control resource allocation of communications of the first communication service type and the second communication service type independently of each other. A simple resource allocation approach can be achieved as the only shared information between the first and second resource controller can be the resource partitioning. The shared resource can be a resource shared only between the first and second, communication service types or may be a resource also shared with other communication service types.

The first admission failure measure may specifically be a communication setup blocking measure for communications of the first communication service type.

According to an optional feature of the invention, the resource partitioner is arranged to partition the shared resource in response to an admission failure measure for the second communication service type This may allow improved performance and in particular may allow improved resource partitioning reflecting the current conditions. For example, the resource partitioning may be performed in response to a relative measure of the admission failures for the different communication service types.

The second admission failure measure may specifically be a communication setup blocking measure for communications of the second communication service type.

According to an optional feature of the invention, the resource partitioner is arranged to determine if the admission failure measure for the first communication service type exceeds the admission failure measure for the second communication service type by a threshold and if so to reallocate a resource amount of the shared resource from the second resource partition to the first resource partition.

This may allow improved resource allocation performance and/or efficient low complexity implementation.

According to an optional feature of the invention, the resource partitioner is arranged to determine if the admission failure measure for the first communication service type exceeds a threshold and if so to reallocate a resource amount of the shared resource from the second resource partition to the first resource partition.

This may allow improved resource allocation performance and/or efficient low complexity implementation.

According to an optional feature of the invention, the resource partitioner is arranged to determine the resource amount in response to the admission failure measure for the first communication service type.

This may allow improved resource allocation performance. For example, the number of codes of a code tree or the proportion of cell transmit power allocated to the first communication service type may depend on the blocking rate for that communication service type and possibly on the blocking rate for the second communication service type.

According to an optional feature of the invention, the resource partitioner is arranged to allocate at least a minimum resource allocation to the first resource partition.

This may allow improved resource allocation performance. For example, a minimum cell transmit power or number of codes may be guaranteed to be allocated to the first communication service type thereby guaranteeing a minimum of support for this communication service type.

According to an optional feature of the invention, the resource partitioner is arranged to limit the resource allocation to the first resource partition to a maximum resource allocation.

This may allow improved resource allocation performance. For example a maximum cell transmit power or number of codes may be guaranteed not to be exceeded thereby guaranteeing a minimum of resource for other communication service types.

According to an optional feature of the invention, the admission failure measure for the first communication service type is a communication service initiation rejection measure for services of the first communication service type.

This may allow improved resource allocation performance and/or efficient low complexity implementation. The service initiation rejection measure may be a blocking measure for call set-ups.

According to an optional feature of the invention, the communication service initiation rejection measure is a communication service initiation rejection rate.

This may allow improved resource allocation performance and/or efficient low complexity implementation. The service initiation rejection measure may be a blocking rate for call set-ups.

According to an optional feature of the invention, the resource partitioner is arranged to generate the admission failure in response to an averaged measure of admission rejections in a time interval.

This may improve the accuracy of the resource partitioning and/or may allow dynamic performance to be optimised for the individual application.

According to an optional feature of the invention, the resource partitioner is arranged to determine an averaging time in response to the communication service type.

This may improve the accuracy of the resource partitioning and may allow dynamic performance to be optimised for the individual application. Specifically, if the resource partitioning is in response to admission failure measures for both the first and the second communication service type different average times may be used for the two admission failure measures. The averaging time may e.g. be a time interval of an averaging window or may be a time constant for a low pass filtering process.

According to an optional feature of the invention, the resource partitioner is arranged to bias the shared resource towards the second resource partitioning until the first admission failure measure exceeds a threshold.

The resource partitioning may be determined in response to other factors than the first admission failure measure but the bias towards the second resource partitioning will be higher when the first admission failure measure is below a threshold than when it exceeds it. This may allow improved resource partitioning.

According to an optional feature of the invention, the shared resource is a power resource.

This may allow improved partitioning of power resources such as a total cell transmit power.

According to an optional feature of the invention, the shared resource is a spreading code resource such as a shared code tree.

This may allow improve partitioning of code resources such as an orthogonal code tree. The spreading code may be a channelisation or a cell separation code. The spreading code resource may specifically be a shared OVSF code tree for a cell.

According to an optional feature of the invention, the cellular communication system is a $3^{rd}$ Generation Partnership Project (3GPP)$3^{rd}$ Generation cellular communication system.

The invention may allow particularly advantageous performance in a $3^{rd}$ Generation cellular communication system such as UMTS.

According to an optional feature of the invention, at least one of the first or second communication service type is a Release 99 communication service type.

The invention may allow particularly advantageous performance for Release 99 communication service types of a $3^{rd}$ Generation cellular communication system.

According to an optional feature of the invention, at least one of the first or second communication service type is a High Speed Downlink Packet Access HSDPA communication service type.

The invention may allow particularly advantageous performance for HSDPA communication service types of a $3^{rd}$ Generation cellular communication system. In particular, the invention may allow efficient and high performance resource allocation between HSDPA and Release 99 services in a UMTS cellular communication system.

According to a second aspect of the invention, there is provided a method of resource allocation in a cellular communication system comprising: a first resource controller for controlling resource allocation for a first communication service type from a first resource partition; a second resource controller for controlling resource allocation for a second communication service type from a second resource partition; the method comprising partitioning a shared resource into at least the first and second resource partition in response to a first admission failure measure for the first communication service type.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a UMTS $3^{rd}$ Generation Cellular communication system. However, it will be appreciated that the invention is not limited to this application but may be applied to many other cellular communication systems.

Figure 1:
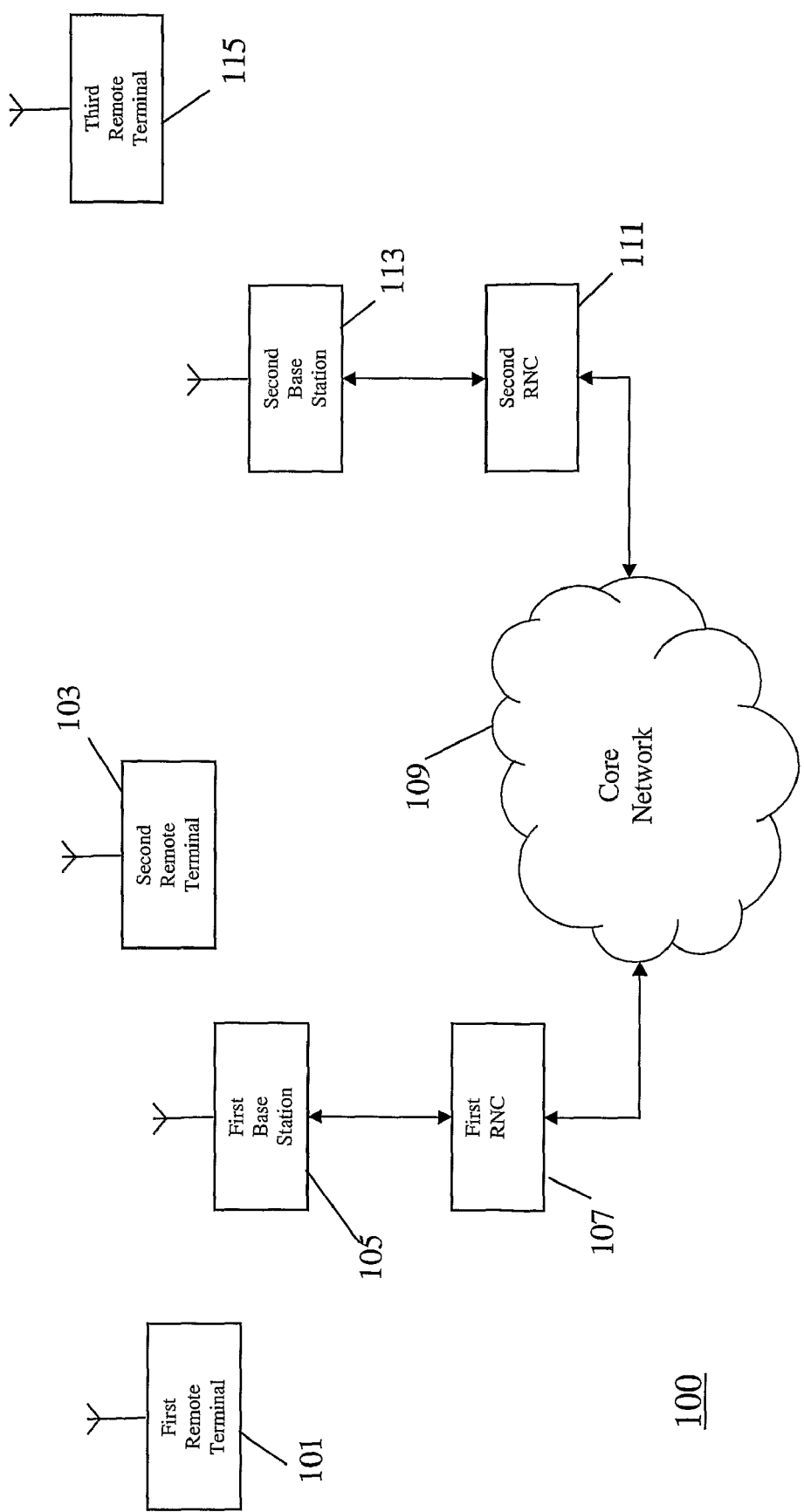
FIG. 1 illustrates an example of a cellular communication system in accordance with some embodiments of the invention.

FIG. 1 illustrates an example of a cellular communication system 100 in accordance with some embodiments of the invention.

In a cellular communication system, a geographical region is divided into a number of cells each of which is served by a base station. The base stations are interconnected by a fixed network which can communicate data between the base stations. A remote terminal (e.g. a User Equipment (UE) or a mobile station) is served via a radio communication link by the base station of the cell within which the remote terminal is situated.

As a remote terminal moves, it may move from the coverage of one base station to the coverage of another, i.e. from one cell to another. As the remote terminal moves towards a base station, it enters a region of overlapping coverage of two base stations and within this overlap region it changes to be supported by the new base station. As the remote terminal moves further into the new cell, it continues to be supported by the new base station. This is known as a handover or handoff of a remote terminal between cells.

A typical cellular communication system extends coverage over typically an entire country and comprises hundreds or even thousands of cells supporting thousands or even millions of remote terminals. Communication from a remote terminal to a base station is known as uplink, and communication from a base station to a remote terminal is known as downlink.

In the example of FIG. 1, a first remote terminal 101 and a second remote terminal 103 are in a first cell supported by a first base station 105.

The first base station 105 is coupled to a first RNC 107. An RNC performs many of the control functions related to the air interface including radio resource management and routing of data to and from appropriate base stations.

The first RNC 107 is coupled to a core network 109. A core network interconnects RNCs and is operable to route data between any two RNCs, thereby enabling a remote terminal in a cell to communicate with a remote terminal in any other cell. In addition, a core network comprises gateway functions for interconnecting to external networks such as the Public Switched Telephone Network (PSTN), thereby allowing remote terminals to communicate with landline telephones and other communication terminals connected by a landline. Furthermore, the core network comprises much of the functionality required for managing a conventional cellular communication network including functionality for routing data, admission control, resource allocation, subscriber billing, remote terminal authentication etc.

The core network 109 is further coupled to a second RNC 111 which is coupled to a second base station 113. The second base station 113 supports a third remote terminal 115.

In the example of FIG. 1, the first base station 105 is supporting a number of different communication service types for the remote terminals 101, 103 of the cell of the first base station 105. Specifically, the first base station 105 is an HSDPA capable base station which can support both R99 and HSDPA services. Thus, in the specific example, the first remote terminal 101 can for example be using an HSDPA service type as well as a R99 service type (for example it may be engaged in a R99 voice communication with the third remote terminal 115 as well as executing an Internet browsing application). Also, the second remote terminal 103 may be using an HSDPA communication service and/or an R99 communication service.

In order to achieve efficient resource utilisation in such a system, it is important that the resource available to the first base station 105 is efficiently and accurately allocated to the different communication service types. However, as the resource allocation to individual communications is managed by independent resource controllers for R99 and HSDPA services, this can be a complex and difficult task.

A simple solution to this problem above is to partition the resource between the different resource controllers by allocating a fixed proportion of the resource to each communication service type. This is a simple process and can ensure that all communication service types are guaranteed to have a minimum available resource. However, it tends to be a very inefficient resource partitioning since not all communication service types will necessarily use the allocated resource at a given time instant. For example, such an approach frequently results in one communication service type not being fully supported while significant amounts of resource allocated to other communication service types being unused.

Improved performance can be achieved by making the resource partitioning for resource controllers for different communication service types variable such that the partition of resource depends on the current conditions. One possible way of achieving this is to measure the resource usage of R99 and HSDPA channels and vary the resource allocated to each type of communication service based on these measurements. However, in UMTS systems this will require measurements to be made at the base station and for these to be reported to the RNC where the resource allocation is performed. However, these measurements are subject to errors, involve some processing at the base station, and result in increased signalling between the base station and the RNC. Furthermore, in such a scenario, the resource allocation is based on the current utilization (i.e. the carried traffic) rather than utilization requested by users (the offered traffic) resulting in suboptimal performance.

In the example of FIG. 1, the system, and specifically the first RNC 107, comprises functionality for partitioning the available resource between different communication service types, and specifically between the R99 and HSDPA communication service types, in response to an admission failure measure of at least one of the communication service types.

Thus, the described system allows the resource allocated to each communication service type controller to be based on the demand made by users for using the specific communication service types rather than by current actual usage of the different communication service types.

Figure 2:
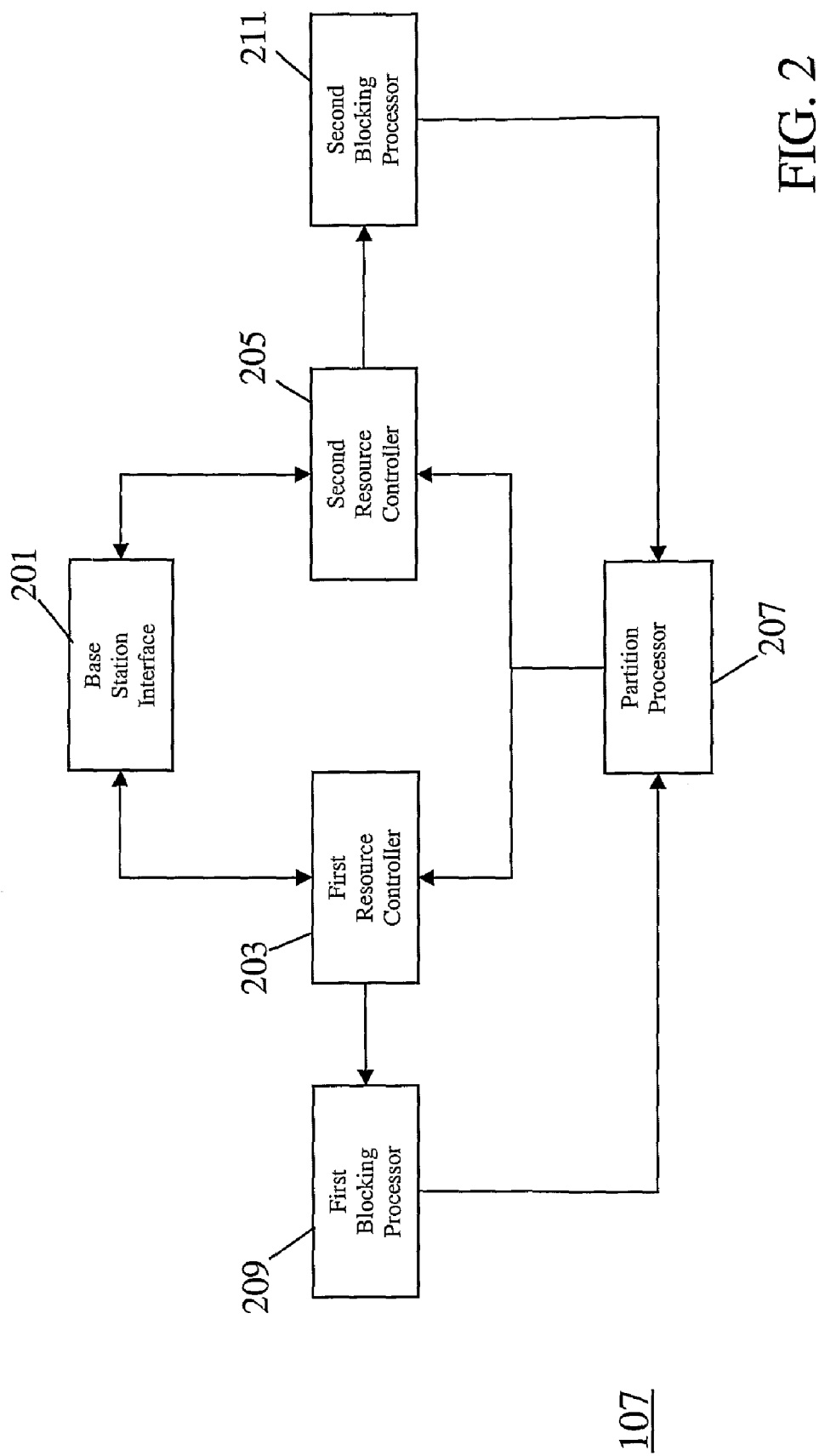
FIG. 2 illustrates an example of an RNC in accordance with some embodiments of the invention.

FIG. 2 illustrates an example of an RNC in accordance with some embodiments of the invention. The RNC may specifically be the first RNC 107 of FIG. 1 and will be described with reference to this. It will appreciated that for clarity and brevity only the elements of the first RNC 107 required for the following description are shown in FIG. 2.

The first RNC 107 comprises a base station interface 201 which is arranged to communicate with the first base station 105 over the Iub interface of the UMTS cellular communication system as will be known to the person skilled in the art.

The base station interface 201 is coupled to a first resource controller 203 and a second resource controller 205. The first resource controller 203 is responsible for performing resource allocation for a first communication service type. In the specific example, the first resource controller 203 performs resource allocation for release 99 services supported by the first base station 105. The second resource controller 205 is responsible for performing resource allocation for a second communication service type. In the example, the second resource controller 205 performs resource allocation for HSDPA services supported by the first base station 105.

It will be appreciated that although the first resource controller 203 and the second resource controller 205 are shown as part of the first RNC 107, some or all of the resource allocation functionality may be located elsewhere. For example, for HSDPA services fast resource allocation between different remote terminals is performed in the base stations.

The first resource controller 203 and the second resource controller 205 are coupled to a partition processor 207. The partition processor 207 partitions a shared resource into a first resource partition for the first resource controller 203 and a second resource partition for the second resource controller 205. Each of the resource controllers 203, 205 can then freely allocate resource within the allocated resource partition. This allows facilitated and a more flexible resource allocation.

The first resource controller 203 is furthermore coupled to a first blocking processor 209. The first blocking processor 209 is arranged to determine an admission failure measure for the first communication service type, i.e. for the R99 services. The admission failure measure is any indication of the failures in admitting new communications i.e. in the example it is an indication of failures of the first resource controller 203 in setting up new R99 communications.

Specifically, the admission failure measure can be determined as a communication service initiation rejection measure. Thus, the first resource controller 203 can receive a number of communication service initiation requests (e.g. R99 call setup requests) from remote terminals and can determine the admission failure measure in response to how many of these requests are rejected. Specifically, the admission failure measure can be determined as the rate of rejection of such requests due to lack of available resource for supporting the requested communication service. Specifically, the admission failure measure can be a blocking rate.

The first blocking processor 209 is furthermore coupled to the partition processor 207 which is arranged to determine the first and second resource partitions in response to the admission failure measure.

Specifically, the partition processor 207 can compare the admission failure measure and specifically the blocking rate to a predetermined threshold and if the admission failure measure exceeds the threshold, the first resource partition can be increased and the second resource partition can be decreased. This will allow the resource partitioning to be flexibly adapted to the current resource demands of the individual communication services reflecting both the demand currently met as well as the demand which currently cannot be met.

In the example, the second resource controller 205 is furthermore coupled to a second blocking processor 211. The second blocking processor 211 is arranged to determine an admission failure measure for the second communication service type, i.e. for the HSDPA services. The admission failure measure is an indication of the failures in admitting new communications i.e. in the example it is an indication of failures of the second resource controller 205 in setting up new HSDPA communications.

Specifically, the admission failure measure can be determined as a communication service initiation rejection measure. Thus, the second resource controller 205 can receive a number of communication service initiation requests (e.g. HSDPA setup requests) from remote terminals and can determine the admission failure measure in response to how many of these requests are rejected. Specifically, the admission failure measure can be determined as the rate of rejection of such requests due to lack of available resource for supporting the requested communication service. Specifically, the admission failure measure can be a blocking rate.

The second blocking processor 209 is furthermore coupled to the partition processor 207 which optionally may also be arranged to determine the first and second resource partitions in response to the admission failure measure for the second communication service type.

Specifically, the partition processor 207 can compare the admission failure measure of the first and second communication types to each other and if the difference exceeds a given amount the resource partitioning can be changed to result in the desired admission failure measure being reduced. It will be appreciated that the admission failure measures can be scaled or otherwise manipulated before the comparison.

The described approach may prevent or reduce resources being wasted due to under usage by a particular communication service type. In the particular example of a UMTS WCDMA application, it can globally maximize the resource utilization based on the demands of the offered traffic.

The shared resource for the communication service types can for example be a transmit power resource such as the maximum combined transmit power in a cell (or equivalently an interference resource). For example in UMTS CDMA systems the total power in a cell is shared between R99 channels and HSDPA channels.

In such an embodiment, the partition processor 207 can base the resource partitioning on the blocking rate (rate of call admission failures) of each communication service type due to the lack of resource at the time the request is made. This can correspond to the rate of radio admission control denying R99 or HSDPA calls access to the system.

For communication service type n, such rate blocking $Q_n$ can be measured as follows:

$$Q_n = F_n/S_n$$

where $F_n$ is the number of failures and $S_n$ is the total number of attempts, where both of these are measured over the same period of time $T_n$. Different averaging techniques can be used such as a sliding window resulting in the failure rate $Q_n$ always being measured over a constant duration $T_n$ for a given communication service type n.

In some embodiments, the averaging time can depend on the communication service type. For example, a communication service type can be used much less often than another one, hence the corresponding averaging period may be chosen much longer so that the estimate $Q_n$ remains a reliable statistical estimate. However, in the particular example, the periods for R99 and HSDPA may typically be identical or similar.

If $S_n$ is zero during any period $T_n$, then $Q_n$ is also defined as zero which is consistent with the fact that $F_n$ is obviously zero and therefore reflects that the resource was not requested during that period.

The partition processor 207 may use this estimate in a suitable algorithm to determine a suitable partition. For example, the failure rates for all communication service types can be high at the same time which does not necessarily mean that an identical power allocation to all the communication service types is optimal. In one possible algorithm, the blocking rates can all be sorted, say in decreasing order, and the difference between adjacent rates are computed and compared to a threshold. If the difference between two adjacent failure rates is greater than the threshold, some resource allocated to the communication service type with the lower failure rate is allocated instead to the communication service type with the higher failure rate.

For system stability reasons, only one power partitioning is typically modified at a time in systems wherein a number of communication service types are considered (i.e. if the partitioning is between three or more different communication service types). The choice of which power partition to adapt can be based on the two communication service types that have the greatest difference between their failure rates.

Another aspect is to decide by how much the power allocation should be modified. Again for system stability reason, it may be preferable that such adaptation is made with a fixed pre-defined step. Such a step can optionally be made dependent on the difference in failure rates, but in many embodiments it is advantageous to use a fixed, reasonably small, step.

Also minimum and/or maximum values may be applied to the different power partitions allocated to the different communication service types. A network operator can e.g. directly control the minimum and maximum amount of resource allocated to each communication service type. Some simple rules can be applied to ensure the consistency of such extreme. For example, the sum of the minima should not exceed the total resource.

As a specific example for R99 and HSDPA channels, the partition processor 207 can compute $Q_{R99}$ and $Q_{hsdpa}$. Say $Q_{99} > Q_{hsdpa}$ then $\Delta = Q_{99} - Q_{hsdpa}$. If $\Delta > $th, then the maximum power allocated to HSDPA channels is decremented by a pre-defined quantity power_step and that given to R99 channels is incremented by the same amount.

As a very specific example, the algorithm can start with the following parameters. R99 initial power allocation is sixteen Watts and HSDPA is four Watts. Averaging period is five min, i.e. this is also the maximum power allocation update rate. The power step used for each adaptation is one Watt. The difference threshold is set at 0.1.

Between t=0 and t=5 ms, only R99 traffic is offered, arrival rate is such that all requests are accepted, hence $Q_{R99}=0$ and since no HSDPA traffic is offered, $Q_{hsdpa}=0$. $\Delta=0<0.1$ hence no update.

Then suppose the R99 offered traffic increases so that at some point some calls are denied access (still no HSDPA traffic offered). Suppose 12% of R99 calls are rejected, then $\Delta=0.12>0.1$ hence the power allocations are updated and are now seventeen Watts and three Watts for R99 and HSDPA respectively.

Now suppose the HSDPA offered traffic starts. Only a few calls can be admitted, hence quickly $Q_{hsdpa}$ becomes >0. Depending on what happens with R99 the power partition can stay the same or will be updated in favour of HSDPA traffic.

The overall mechanism may ensure that the power allocated to R99 and HSDPA channels is determined by the offered traffic rather than by the carried traffic. This provides improved performance as the carried traffic only reflects the needs of the users already admitted in the system rather than the needs of the users trying to gain access to the system.

The shared resource for the communication service types can for example be a code resource such as the OVSF (Orthogonal Variable Spreading Factor) codes available in a cell.

Thus, in such embodiments, an OVSF code tree can be partitioned into a section allocated to the R99 channels and one allocated to HSDPA channels. The partitioning of the code tree is made dependent on the blocking rate of R99 channels and/or the HSDPA channels due to OVSF code limitation.

More specifically, when a cell is configured (cell initialization), the maximum number of codes can be allocated for HSDPA channels (i.e. fifteen codes with SF16). The minimum and maximum number of codes allocated to HSDPA channels can be specified by a network operator. Typical numbers are expected to be five and fifteen respectively but it is possible to use a narrower range.

The more codes that are available for HSDPA traffic, the higher the cell throughput and the peak data rate a user can experience. Therefore, in some such embodiments, the partition processor 207 allocates as many codes as possible to HSDPA. Only when the code blocking rate for R99 channels exceeds a given threshold are some code(s) moved from the HSDPA partition to the R99 partition. The number of codes to be moved from one partition to the other can be fixed or may depend on the measured blocking rate (e.g. the higher the blocking rate, the more codes are reallocated). In its simplest form, the scheme would move one code at a time.

When the measured blocking rate has been zero for a given period of time (typically significantly longer than the averaging period used to measure the blocking rate itself), the scheme can move some code(s) back to the HSDPA partition. The number of codes given back to the HSDPA partition can also be specified by a network operator (at least one, at most the number of codes previously moved from HSDPA partition to R99 partition).

Additionally, the partition processor 207 may regularly check the status of the code tree occupancy and can execute a code reshuffling from time to time in order to optimize the code tree occupancy by making SF16 codes available.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A cellular communication system comprising:
   a first resource controller for controlling resource allocation for a first communication service type from a first resource partition;
   a second resource controller for controlling resource allocation for a second communication service type from a second resource partition; and
   a resource partitioner for partitioning a shared resource into at least the first and second resource partitions in response to a first admission failure measure for the first communication service type, the resource partitioner is arranged to generate the first admission failure measure in response to an averaged measure of admission rejections in a time interval for the first communication service type;
   wherein the resource partitioner is arranged to determine if the admission failure measure for the first communication service type exceeds the admission failure measure for the second communication service type by a threshold and if so to reallocate a resource amount of the shared resource from the second resource partition to the first resource partition.

2. A cellular communication system as claimed in claim 1 wherein the resource partitioner is arranged to partition the shared resource in response to an admission failure measure for the second communication service type.

3. A cellular communication system as claimed in claim 1 wherein the resource partitioner is arranged to bias the shared resource towards the second resource partitioning until the first admission failure measure exceeds a threshold.

4. A cellular communication system as claimed in claim 1 wherein the resource partitioner is arranged to determine if the admission failure measure for the first communication service type exceeds a threshold and if so to reallocate a resource amount of the shared resource from the second resource partition to the first resource partition.

5. A cellular communication system as claimed in claim 1 wherein the resource partitioner is arranged to allocate a minimum and maximum resource allocation to the first resource partition.

6. A cellular communication system as claimed in claim 1 wherein the admission failure measure for the first communication service type is a communication service initiation rejection measure for services of the first communication service type.

7. A cellular communication system as claimed in claim 2 wherein the resource partitioner is arranged to determine a difference between the first and second admission failure measures, wherein the difference is compared to a threshold in determining repartitioning.

8. A cellular communication system as claimed in claim 1 wherein the shared resource is one of the group of: a power resource, a spreading code resource, and a shared code tree.

9. A method of resource allocation in a cellular communication system comprising a first resource controller for controlling resource allocation for a first communication service type from a first resource partition and a second resource controller for controlling resource allocation for a second communication service type from a second resource partition, the method comprising:
   partitioning a shared resource into at least the first and second resource partitions in response to a first admission failure measure for the first communication service type, the partitioning generates the first admission failure measure in response to an averaged measure of admission rejections in a time interval for the first communication service type;

wherein the resource partitioning is arranged to determine if the admission failure measure for the first communication service type exceeds the admission failure measure for the second communication service type by a threshold and if so reallocating a resource amount of the shared resource from the second resource partition to the first resource partition.

* * * * *